July 28, 1970     L. E. SHEFFER     3,521,904
VEHICLE STRUCTURE
Filed March 20, 1968     3 Sheets-Sheet 2
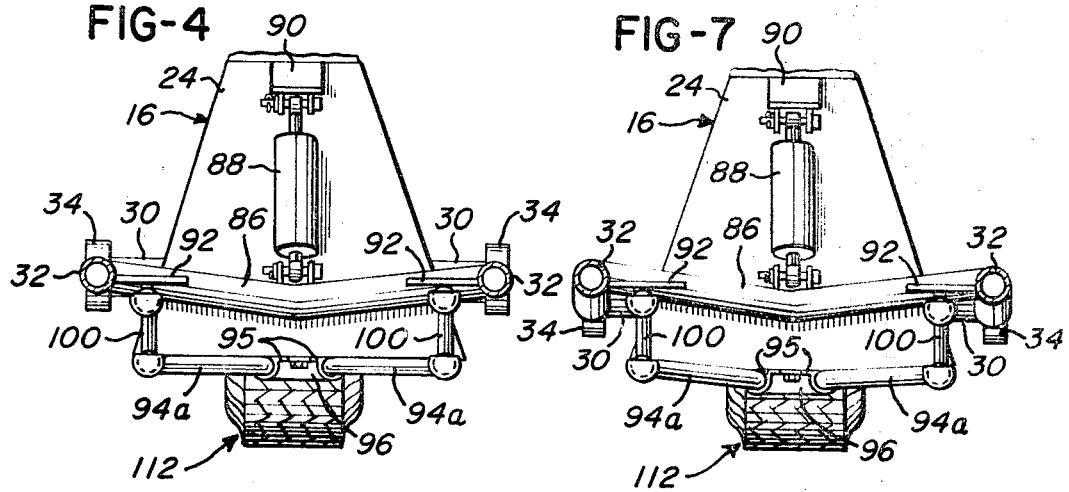
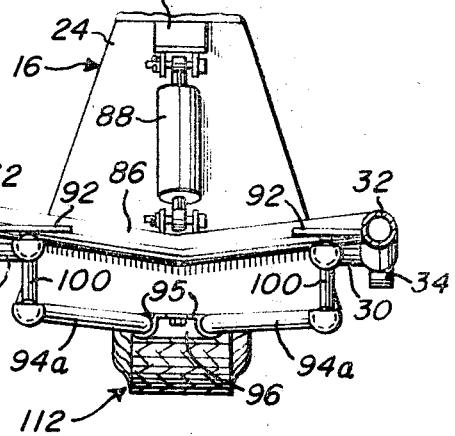
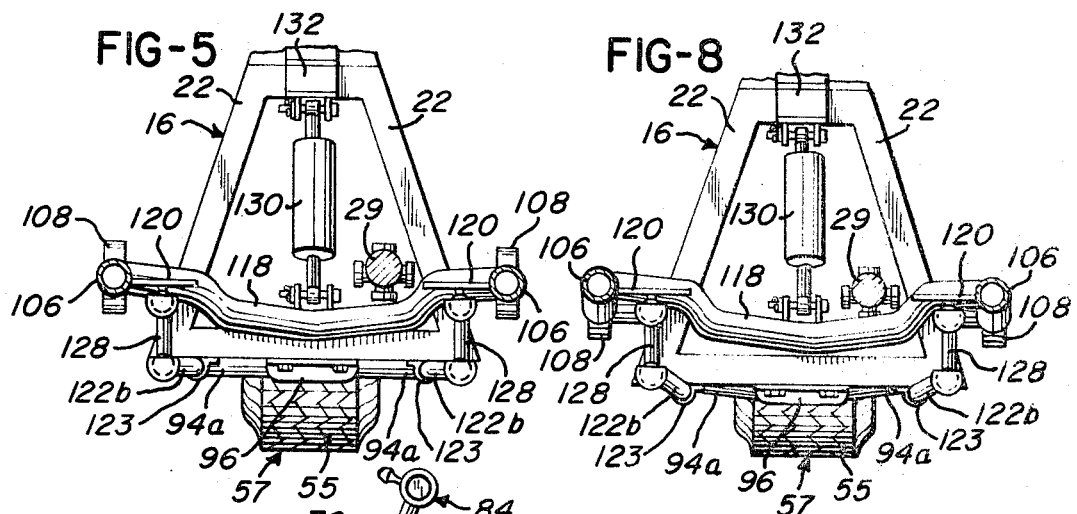
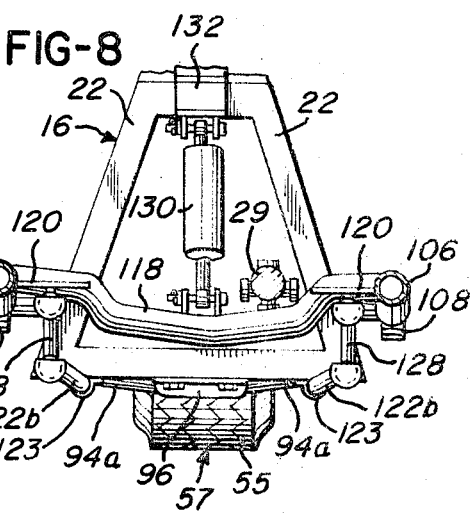
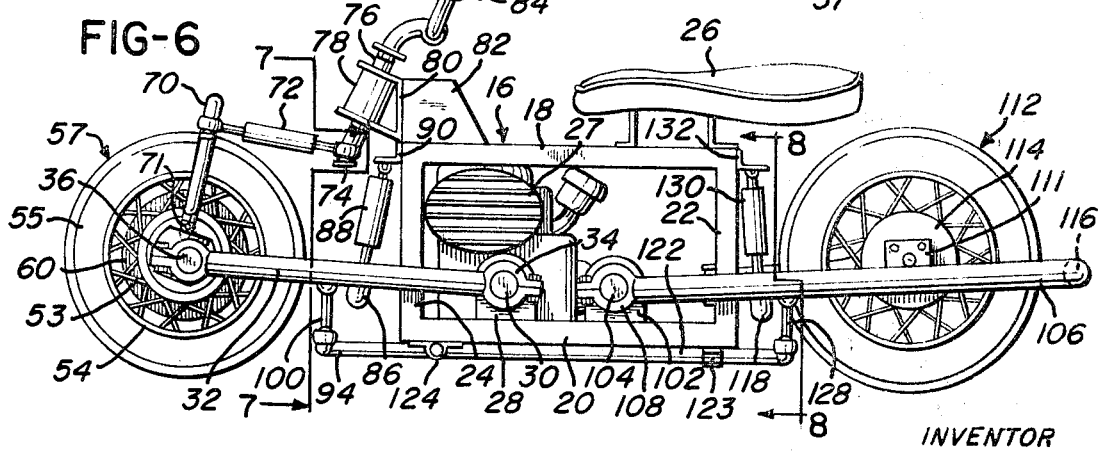
INVENTOR
LAWRENCE E. SHEFFER
BY *William R Jacox*
ATTORNEY July 28, 1970 L. E. SHEFFER 3,521,904
VEHICLE STRUCTURE
Filed March 20, 1968 3 Sheets-Sheet 3
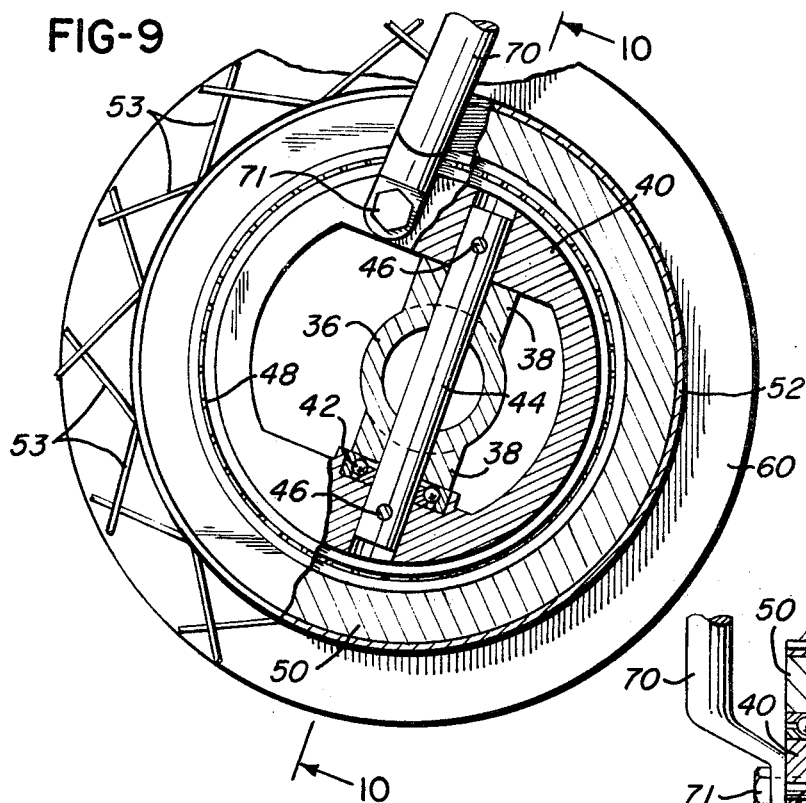
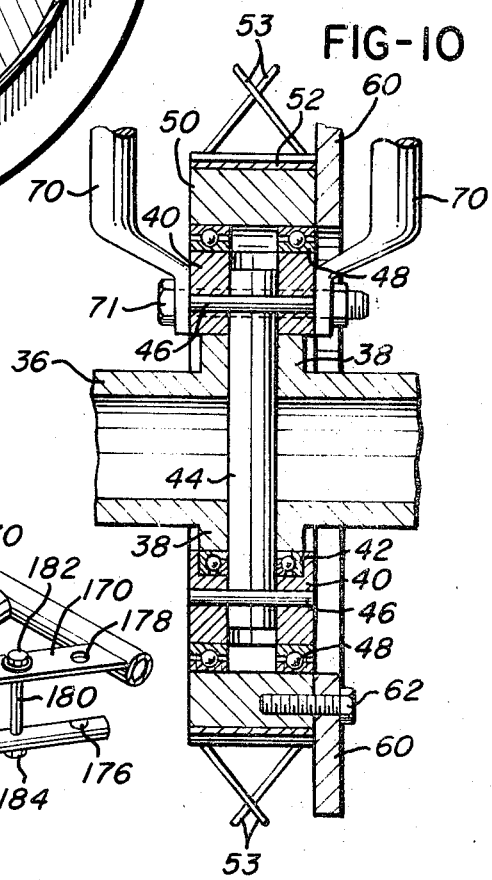
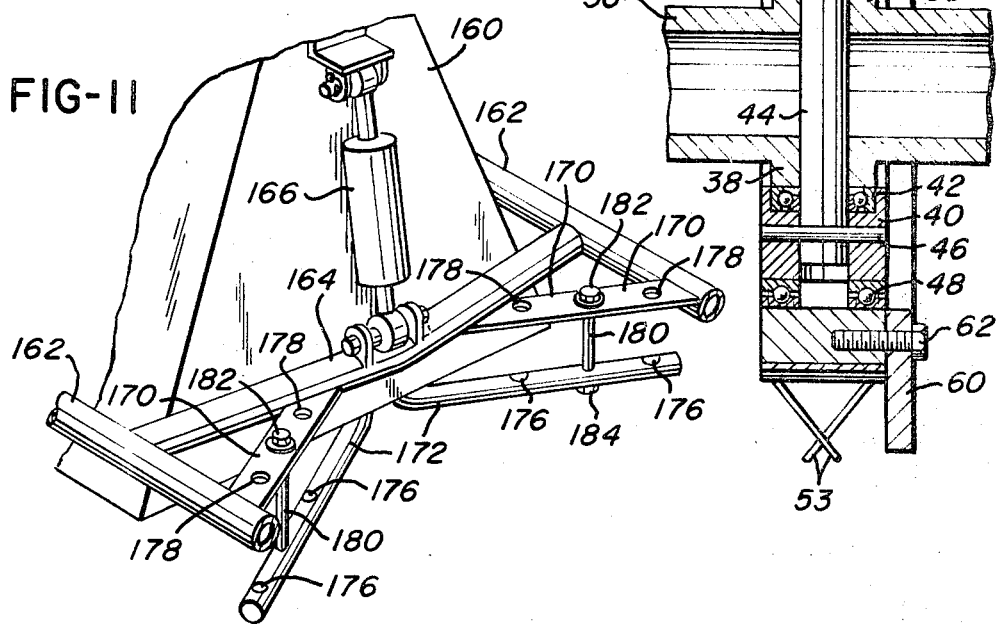
INVENTOR
LAWRENCE E. SHEFFER
BY William R Jacox
ATTORNEY

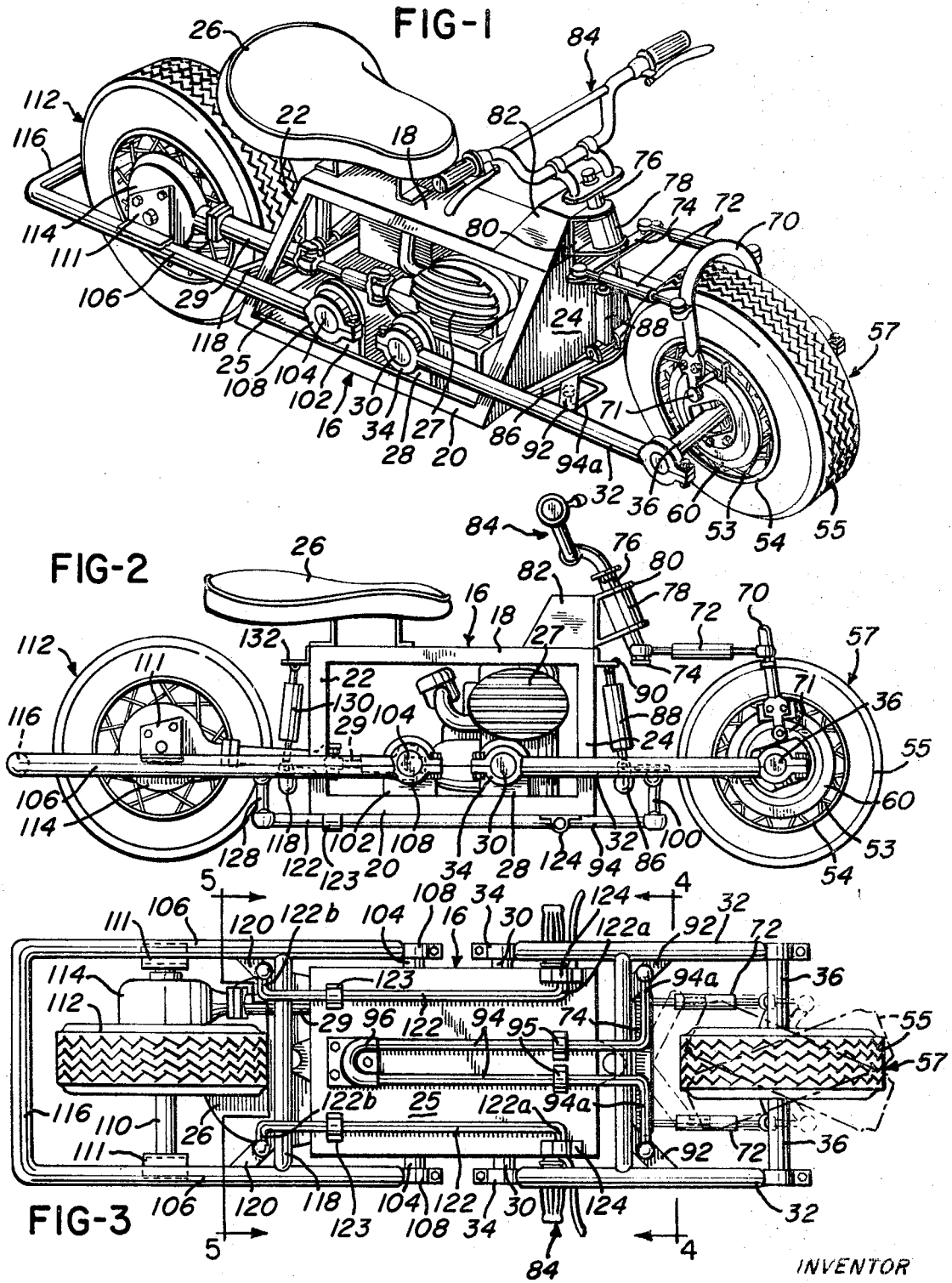

United States Patent Office 3,521,904
Patented July 28, 1970

3,521,904
VEHICLE STRUCTURE
Lawrence E. Sheffer, R.R. 6, Portland, Ind. 47371
Continuation-in-part of application Ser. No. 549,881,
May 13, 1966. This application Mar. 20, 1968, Ser.
No. 714,543
Int. Cl. B62k 25/60
U.S. Cl. 280—270  15 Claims

ABSTRACT OF THE DISCLOSURE

Vehicle structure such as a motorcycle, bicycle or the like. The vehicle structure has a body member or frame member and comprises a suspension system which supports the body member or frame member from the wheel members. Pivotal support means are attached to each of the wheel members and to the body member. Torsion bar means join the body member to the pivotal support means.

RELATED APPLICATION

This application is a continuation-in-part of my copending patent application Ser. No. 549,881, filed May 13, 1966, now abandoned.

BACKGROUND OF THE INVENTION

In the past, most vehicles, such as a motorcycle or the like, have been provided with means which rigidly attach the wheel members to the frame member or to a body member. Therefore, when the wheel members traversed rough terrain or bumps or the like, there has been direct transmission of shocks to the frame member or body member and to the rider of the motorcycle. Attempts to employ spring members for cushioning of the frame member have been rather unsuccessful.

An object of this invention is to provide a vehicle, such as a motorcycle or bicycle or the like, having suspension means connecting a body member to the wheel members and having resilient means for reducing the degree of disturbance transmitted between the wheel members to the body member.

Another object of this invention is to provide such a vehicle having a relatively low center of gravity.

Another object of this invention is to provide such a vehicle which steers and guides easily so that the direction of movement of the vehicle is readily controlled at any rate of travel thereof.

Another object of this invention is to provide such a vehicle which has a minimum number of structural members and support elements.

Another object of this invention is to provide such a vehicle which can be constructed and built at relatively low costs.

Other objects and advantages reside in the construction of the invention, combinations thereof, the method of manufacture, and the mode of operation, as will become more apparent from the following description.

BRIEF DESCRIPTION OF THE DRAWINGS

FIG. 1 is a perspective view of vehicle structure of this invention.

FIG. 2 is a side elevational view of the vehicle structure of this invention.

FIG. 3 is a bottom view of the vehicle structure of this invention.

FIG. 4 is a sectional view taken substantially on line 4—4 of FIG. 3.

FIG. 5 is a sectional view taken substantially on line 5—5 of FIG. 3.

FIG. 6 is a side view of the vehicle structure of this invention, taken from the opposite side from that of FIG. 2. FIG. 6 also shows the body member of the structure in another operational position with respect to the wheel members.

FIG. 7 is a sectional view taken substantially on line 7—7 of FIG. 6.

FIG. 8 is a sectional view taken substantially on line 8—8 of FIG. 6.

FIG. 9 is a fragmentary enlarged side elevational view, with parts broken away and shown in section, of a portion of the front wheel structure and bearing means therefor, the elements being shown in the positions thereof illustrated in FIG. 6.

FIG. 10 is a sectional view taken substantially on line 10—10 of FIG. 9.

FIG. 11 is a fragmentary perspective view, drawn on a slightly larger scale than FIGS. 1–8, showing a modification in a portion of the structure of this invention.

DESCRIPTION OF THE PREFERRED EMBODIMENTS

Vehicle structure of this invention is shown herein as relating to a motorcycle. However, within the purview of this invention, vehicle structure of this invention may relate to a vehicle which is not self-propelled and which may be referred to as a bicycle or the like. Herein the vehicle structure of this invention is shown as being a two wheel vehicle structure having one front wheel and one rear wheel. It is to be understood, however, that vehicle structure of this invention may comprise vehicle structure which has more than two wheels. The vehicle structure shown herein comprises support structure in the form of a body member or frame member 16, having an upper platform 18, a plurality of lower frame members 20, a plurality of rear vertical members 22, and a front vertical member or wall 24. A floor 25 is carried by the lower frame members 20. An engine or motor or the like 27 is shown supported upon the floor 25 and has a drive shaft 29 operably joined thereto and extending rearwardly therefrom. A seat member 26 is attached to the upper platform member 18.

Attached to the lower frame members 20 at opposed side portions of the body 16 are a pair of brackets 28. Attached to each of the brackets 28 is a stud 30. Pivotally attached to each stud 30 by means of a connector portion 34 is an arm 32. Each arm 32 extends forwardly from its respective stud 30 and from one side of the body 16.

An axle 36 is secured to the arm 32 and extends therebetween. The axle 36, intermediate the ends thereof has a flange 38 which is disposed within a hub 40, shown in FIGS. 9 and 10. The hub 40 has a thrust bearing 42 upon which the flange 38 rests. A connector pin 44 extends through the hub 40, through the flange 38, through the axle 36, and through the thrust bearing 42. The connector pin 44 is angularly inclined and the longitudinal axis thereof is within a substantially vertical plane.

The connector pin 44 is secured to the hub 40 by a pair of pintles 46 which extend transversely through the hub 40 and the connector pin 44. As shown in FIG. 9, the axle 36 and the connector pin 44 are positioned rearwardly of the center of the hub 40, for a reason discussed below.

Encompassing the hub 40 is a bearing member 48. Encompassing the bearing member 48 is a wheel 50 having a rim 52. A plurality of spokes 53 join the rim 52 to a tire carrier 54, shown in FIGS. 1, 2, and 6. The tire carrier 54 carries a tire 55. Thus, a front wheel structure 57 is formed.

A brake disc 60 is attached to the wheel 50 by screws 62 for rotation with the wheel 50. The brake disc 60 is operated upon by any suitable means, not shown, for braking the wheel 50 and the wheel structure 57.

Attached to the hub 40 by means of a bolt 71 is a yoke 70 which extends over and straddles the wheel 50 and the tire 55 and has a portion on each of the opposed sides thereof. A pair of links 72, shown in FIGS. 1, 2, 3, and 6, are pivotally attached to the yoke 70, there being one link 72 pivotally attached to each side of the yoke 70. Each link 72 extends from its respective side of the yoke 70 to a connector bar 74 and is pivotally connected thereto adjacent an end thereof. The pivotal connections of the links 72 to the yoke 70 and to the connector bar 74 are, preferably, multi-axes types of connections, such as ball and socket connections, or the like, and permit limited pivotal movement about a plurality of axes.

A stem 76 is rigidly attached to the connector bar 74 and extends upwardly therefrom through a journal housing 78.

The journal housing 78 is secured to a bracket 80 which is secured to an upper front portion 82 of the platform 18. The upper end of the stem 76 is attached to a handle bar unit 84.

Between the axle 36 and the body member 16 and generally parallel to the axle 36 is a transverse member 86. The transverse member 86 is joined to the arms 32 and extends therebetween. A shock absorber 88 is pivotally attached to the transverse member 86 and to a bracket 90 at the upper part of the front vertical member or wall 24.

As best shown in FIGS. 1 and 3, a connector plate 92 extends between each arm 32 and transverse member 86 and is secured thereto.

As shown in FIG. 3, an elongate torsion bar 94 has a central U-shaped portion thereof attached by a holder 96 to the lower surface of the floor 25. The torsion bar 94 extends through bearing members 95 which are spaced from the holder 96 and are attached to the floor 25. The torsion bar 94 has laterally extending end portions 94a. Each end portion 94a of the torsion bar 94 is connected to an upwardly extending link 100. The upper end of each link 100 is attached to one of the connector plates 92. Preferably, the junction at each end of each link 100 is a multi-directional pivotal connection, such as a ball and socket joint or the like, which permits limited pivotal movement about a plurality of axes.

Also, attached to the lower frame members 20 at opposed side portions of the body 16 are a pair of brackets 102. Attached to each of the brackets 102 is a stud 104. An arm 106 is pivotally carried by each stud 104 by means of a connector 108. Each arm 106 extends rearwardly from one side of the body 16.

An axle 110 is attached by a bracket 111 to each of the arms 106 and extends therebetween. A rear wheel structure 112 is rotatably carried by the axle 110. A transmission unit 114, shown in FIGS. 1, 2, and 3, is operably connected to the wheel structure 112 for rotation thereof. The transmission unit 114 is also operably connected to the drive shaft 29 for operation thereby.

A transverse member 116 is shown joined to the arms 106 rearwardly of the wheel structure 112.

Forwardly of the rear wheel structure 112 and rearwardly of the body 16 is a transverse member 118 which is secured to the arms 106 and extends therebetween.

A connector plate 120, shown in FIGS. 3, 5, and 8, joins each arm 106 to the transverse member 118.

A pair of torsion bars 122, shown in FIG. 3, are disposed below the floor 25. Each torsion bar 122 has an end portion 122a which is retained by a holder 124 which is attached to the lower surface of the floor 25. Each torsion bar 122 also extends through a bearing 123 which is attached to the rearward portion of the floor 25. Each torsion bar 122 has an opposite end portion 122b which is angular with respect to the major part of the torsion bar 122 and which is joined to an upwardly extending link 128. The upper end of each link 128 is joined to one of the connector plates 120 by a ball and socket type of joint. Preferably, the juncture at each end of the link 128 is a multi-directional pivotal connection, such as a ball and socket joint or the like, which permits limited pivotal movement about a plurality of axes.

A shock absorber 130 is pivotally attached to a bracket 132 which is secured to the rearward portion of the body 16. The shock absorber 130 is also pivotally attached to the transverse member 118 and extends between the transverse member 118 and the bracket 132.

OPERATION

Vehicle structure of this invention as shown in the drawings herein is adapted to be propelled by the motor or engine 27 which rotates the rear wheel structure 112 through the drive shaft 29 and through the transmission unit 114. An operator of the vehicle sits upon the seat 26 and grasps the handle bar unit 84. The direction of movement of the vehicle is governed by controlling the direction of movement of the front wheel structure 57.

The front wheel structure 57 is pivotally movable about the axis of the connector pin 44. The wheel 50 is rotatable about the hub 40 as the wheel 50 is rotatably carried upon the hub 40 by the bearing 48, as shown in FIGS. 9 and 10.

Steering of the front wheel structure 57 is accomplished by pivotal movement of the handle bar unit 84 about the axis of the stem 76, thus causing pivotal movement of the stem 76. Thus, the connector bar 74 which is attached to the stem 76 is moved about the axis of the stem 76. Thus, the links 72 which are attached to the connector bar 74 are moved substantially longitudinally. One of the links 72 moves forwardly while the other link 72 moves rearwardly. Thus, the yoke 70 and the hub 40, which is attached thereto, are pivotally moved about the axis of the connector pin 44. Thus, the wheel structure 57 is pivotally moved with respect to the axle 36, as illustrated by broken lines in FIG. 3.

As shown in FIG. 9, and as discussed above, the connector pin 44 is disposed rearwardly with respect to the center of the hub 40. Thus, the connector pin 44 is positioned rearwardly with respect to the axis of rotation of the wheel 50. It has been found that such relationship between the axle 36, the connector pin 44, the hub 40, and the wheel 50 is extremely beneficial to the steering operation of the wheel structure 57. Such front wheel structure 57 steers more easily than front wheel structure which pivotally moves about its axis of rotation. The front wheel structure 57 of this invention steers with a minimum amount of pivotal movement thereof, regardless of the rate of movement of the vehicle. Guidance of the front wheel structure 57 of the vehicle of this invention is considerably easier than guidance of a vehicle which has front wheel structure which pivots about its axis of rotation.

The pivotal position of the arms 32 about the axis of the studs 30 is governed by the torsion bar 94. Thus, the torsion bar 94 controls the angular position of the arms 32 with respect to the body 16. The torsion bars 122 govern the angular position of the arms 106 with respect to the body 16. The arms 32 and 106 are normally horizontal, as shown in FIGS. 1 and 2, so that the arms 32 and 106 are normally substantially parallel with the lower frame member 20 of the body 16. However, it is to be understood that under different load conditions upon the body 16 or if different resilient forces of the torsion bars 94 and 122 exist, another angular position of the arms 32 and 106 with respect to the body 16 may be normal.

Thus, it is understood that the body 16 is suspended from the front wheel structure 57 and from the rear wheel structure 112 by means of the arms 32 and 106, respectively. However, for a given loading of the body 16, the torsion bars 94 and 122 resiliently determine the elevational position of the body 16 with respect to the front wheel structure 57 and the rear wheel structure 112.

If vehicle structure of this invention, as it travels, should suddenly encounter a bump or other irregular surface conditions, forces may be created upon the vehicle structure urging relative vertical movement between the body 16 and the front wheel structure 57 and/or between the rear wheel structure 112 and the body 16. FIG. 6 shows a condition in which the arms 32 and 106 are angular with respect to the body 16. In such condition, the body 16 is relatively lower than the position thereof shown in FIGS. 1 and 2. Such relative movement between the arms 32 and the body 16 is permitted by resilient torsional operation of the torsion bar 94, as the torsion bar 94 is attached to the arms 32 through the links 100 and the connector plates 92. Such relative movement between the arms 106 and the body 16 is permitted by resilient torsional operation of the torsion bars 122, as the torsion bars 122 are connected to the arms 106 through the links 128 and the connector plates 120. Thus, the torsion bars 94 and 122 continuously urge return of the body 16 to its normal relative position with respect to the wheel structures 57 and 112.

The shock absorber 88, which is attached to the body 16 and to the traverse member 86, dampens and controls the rate of pivotal movement of the arms 32 with respect to the body 16. The shock absorber 130, which is attached to the body 16 and to the transverse member 118, dampens and controls the rate of pivotal movement of the arms 106 with respect to the body 16.

As relative pivotal movement between the arms 32 and the body 16 occurs, there is, of course, relative movement between the front wheel structure 57 and the body 16. When such relative movement between the front wheel structure 57 and the body 16 occurs, there is relative pivotal movement between the yoke 70 and the links 72. Such relative pivotal movement between the yoke 70 and the links 72 causes a change in the angular relationship between the yoke 70 and the links 72, as shown in FIG. 6. Thus, steering operation of the front wheel structure 57 by means of the handle bar unit 84 is not affected by relative movement between the wheel structure 57 and the body 16.

It is to be understood that the structure of this invention is such that the arms 32 and 106 may be attached to the body 16 at any desired position. Therefore, the center of gravity of the body member and the center of gravity of the vehicle structure may be relatively low.

FIGURE 11

FIG. 11 illustrates a modification in the connection means between torsion bar structure and pivotal arm structure of this invention. A body member 160 has arm members 162 pivotally attached thereto at each of opposed sides thereof in a manner not shown. The arm members 162 may be similar to the arms 32 or 106 shown in FIGS. 1–6. The arms 162 are joined to wheel structure, not shown, which may be similar to the wheel structure 57 or 112. A transverse member 164 is connected to the arms 162 and extends therebetween. A shock absorber 166 is pivotally attached to the body 160 and to the transverse member 164. A connector plate 170 is attached to each arm 162 and to the transverse member 164.

A torsion bar or bars 172 are attached to the body 160 at the lower portion thereof and preferably extend longitudinally with respect to the body 160. The torsion bars 172 may, for example, be similar to the torsion bars 94 and 122 shown in FIG. 3. The torsion bars 172 extend from below the body 160 angularly to positions below the connector plates 170. Each of the torsion bars 172 has a plurality of holes 176 therethrough, each of which is in alignment with a hole 178 through its respective connector plate 170.

A bolt or the like 180 extends through one of the holes 178 in each connector plate 170 and through a hole 176 in its respective torsion bar 172 which is in alignment therewith. Each bolt 180 has a head 182 at one end thereof and a nut 184 on the other end thereof and thus retains the extending portion of the torsion bar 172 in desired relationship with respect to its connector plate 170.

The value of the torsional force which may be applied to each torsion bar 172 is determined by the position of its bolt 180 with respect to the torsion bar 172. The extending portion of each torsion bar 172 which is shown in FIG. 11 serves as a lever with respect to the other portions of the torsion bar 172 to apply a torsional force thereupon. Therefore, the nearer the bolt 180 is to the end of the torsion bar 172, the greater is the torsional force which may be applied to the torsion bar 172. Thus, the value of resilient forces which are applied in positioning of the body 160 of the vehicle with respect to the wheels thereof may be changed by moving the bolts 180 to a different position with respect to the connector plates 170 and with respect to the extending portion of the torsions bars 172. Such change in the torsional forces may be desired if the weight carried by the body 160 is changed or if a different degree of resiliency in the positioning of the vertical position of the body 160 is desired.

Thus, it is understood that vehicle structure of this invention includes a resilient suspension system for supporting a body member from the wheel members.

Thus, the body member of vehicle structure of this invention may travel smoothly and easily over various types of road surfaces and terrains. The front wheel structure of a vehicle of this invention is easily and readily guided at low rates of speed of the vehicle, as well as at higher rates of speed of the vehicle.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Two wheel vehicle apparatus comprising:
   a body member, the body member having a forward portion and a rearward portion,
   first arm means, the first arm means being pivotally attached to the body member and extending forwardly therefrom at opposed side portions thereof,
   a front axle attached to the first arm means at a position forwardly of the body member,
   front wheel structure pivotally and rotatably carried by the front axle,
   steering means attached to the body member and to the front wheel structure for pivotal movement of the front wheel structure,
   second arm means, the second arm means being pivotally attached to the body member and extending rearwardly therefrom at opposed side portions thereof,
   a rear axle attached to the second arm means at a position rearwardly of the body member, rear wheel structure rotatably carried by the rear axle,
first elongate torsion bar means, the first elongate torsion bar means having a portion attached to the body member, the first elongate torsion bar means having a lateral portion which is angular with respect to the portion which is attached to the body member, the lateral portion being attached to the first arm means for resiliently determining the relative pivotal position of the first arm means with respect to the body member,
second elongate torsion bar means, the second elongate torsion bar means having a portion attached to the body member, the second elongate torsion bar means having a lateral portion which is angular with respect to the portion which is attached to the body member, the lateral portion being attached to the second arm means for determining the relative pivotal position of the first arm means with respect to the body member.

2. The apparatus of claim 1 in which the front axle extends through the front wheel structure and a portion of the front wheel structure is pivotal and a portion of the front wheel structure is rotatable, the pivotal axis of the portion of the front wheel structure which is pivotal being positioned rearwardly of the axis of rotation of the portion of the front wheel structure which is rotatable.

3. The apparatus of claim 1 in which the front wheel structure includes a hub encompassing the front axle, a connector pin extending through the hub and the axle and pivotally attaching the hub to the axle, and a wheel member rotatably carried by the hub.

4. The apparatus of claim 3 in which the connector pin of the front wheel structure is disposed rearwardly from the axis of rotation of the wheel member.

5. Vehicle apparatus of the type described comprising:
a body member,
a first pair of arms pivotally attached to the body member for pivotal movement about a substantially horizontal axis, the first pair of arms extending from a portion of the body member,
an axle attached to the first pair of arms and extending therebetween,
a second pair of arms pivotally attached to the body member for pivotal movement about a substantially horizontal axis, the second pair of arms extending from a portion of the body member which is opposite from that of the first pair of arms,
an axle attached to the second pair of arms and extending therebetween,
an elongate resilient torsion member having a portion attached to the body member, the resilient torsion member having an end portion which is angular with respect to the portion thereof which is attached to the body member,
means attaching the end portion of the resilient torsion member to the first pair of arms,
a second elongate resilient torsion member having a portion attached to the body member, the second resilient torsion member having an end portion which is angular with respect to the portion thereof which is attached to the body member,
means attaching the end portion of the second resilient torsion member to the second pair of arms,
first wheel structure,
means rotatably attaching the first wheel structure to the axle which extends between the first pair of arms,
second wheel structure,
means rotatably attaching the second wheel structure to the axle which extends between the second pair of arms.

6. The apparatus of claim 5 in which the means attaching the end portion of the resilient torsion member to the first pair of arms is adjustable.

7. The apparatus of claim 5 in which the means attaching the end portion of the second resilient torsion member to the second pair of arms is adjustable.

8. The apparatus of claim 5 in which the means rotatably attaching the first wheel structure to the axle which extends between the first pair of arms includes means pivotally attaching the first wheel structure to the axle which extends between the first pair of arms.

9. The apparatus of claim 8 in which the means pivotally attaching the first wheel structure to the axle which extends between the first pair of arms includes means positioning the pivotal axis of the first wheel structure at a location between the axis of rotation of the first wheel structure and the body member.

10. The apparatus of claim 5 which includes a thrust bearing and a hub carried by the axle which is attached to the first pair of arms, a connector pin within the hub and extending through the thrust bearing and through the axle and attaching the thrust bearing and the hub to the axle,
a support bearing encompassing the hub,
a wheel encompassing the support bearing, the wheel thus being rotatable and pivotal with respect to said axle.

11. The apparatus of claim 10 in which the connector pin is angularly inclined with respect to a vertical line, with the longitudinal axis of the connector pin being within a substantially vertical plane.

12. The apparatus of claim 10 in which a yoke is attached to the hub and straddles the wheel, the yoke having a side portion at each side of the wheel,
a pair of links pivotally connected to the yoke, there being one link attached to each side portion of the yoke,
a connector bar, each link also being pivotally attached to the connector bar at spaced-apart portions thereof, the pivotal connections of the link to the yoke and to the connector bar being multi-axes connections which permit limited pivotal movement about a plurality of axes,
a stem secured to the connector bar substantially normal thereto,
a bracket carried by the body member,
means pivotally attaching the stem to the bracket,
steering means connected to the stem for pivotal movement thereof and thus for pivotal movement of the wheel with respect to the axle.

13. A two wheel vehicle comprising:
a body member having a forward portion and a rearward portion which extend along a substantially horizontal longitudinal axis which is generally in the direction of travel of the vehicle,
first support means attached to the body member by torsion means and extending forwardly therefrom at the forward portion thereof, the support means being fixed with respect to the longitudinal axis of the body member so that the support means is not movable laterally with respect to the longitudinal axis,
an axle attached to the first support means normal to the longitudinal axis of the body member and extending laterally therefrom,
a hub carried by the axle,
means pivotally attaching the hub to the axle so that the hub is pivotal with respect to the axle,
an annular support bearing encompassing the hub and pivotally movable therewith,
a wheel encompassing the support bearing and rotatably supported thereby,
the wheel thus being rotatable about the axis of the support bearing and pivotal about the axle,
a second wheel, means attaching the second wheel to the body member at the rearward portion thereof.

14. The two wheel vehicle of claim 13 in which the annular support bearing is eccentric with respect to the axle.

15. The two wheel vehicle of claim 14 in which the means pivotally attaching the hub to the axle includes a thrust bearing and a connector pin, the connector pin being within the hub and extending through the thrust bearing and the axle, the thrust bearing separating the axle from the hub at the lower portion thereof.

References Cited

UNITED STATES PATENTS

| | | | |
|---|---|---|---|
| 444,639 | 1/1891 | O'Neill. | |
| 1,527,905 | 2/1925 | Neracher | 280—277 |
| 1,803,055 | 4/1931 | Causan. | |
| 2,025,040 | 12/1935 | Christman et al. | 280—96.3 |
| 2,210,485 | 8/1940 | Hawkins | 267—57 |
| 2,401,869 | 6/1946 | Halliday | 267—57 X |
| 2,542,363 | 2/1951 | Sarnac | 267—57 |
| 2,622,896 | 12/1952 | Wilkinson | 267—57 X |
| 3,022,992 | 2/1962 | Hanslip | 267—57 |
| 3,202,236 | 8/1965 | Allison | 280—124 |

FOREIGN PATENTS 558,387    1/1944    Great Britain.

KENNETH H. BETTS, Primary Examiner

U.S. Cl. X.R.

180—32; 267—15; 280—279, 283